United States Patent [19]

Daugherty

[11] Patent Number: 4,572,878
[45] Date of Patent: Feb. 25, 1986

[54] BATTERY TEMPERATURE SENSOR AND HOUSING THEREFOR

[75] Inventor: James D. Daugherty, Brookfield, Ohio

[73] Assignee: General Motors Corporation, Detroit, Mich.

[21] Appl. No.: 683,349

[22] Filed: Dec. 19, 1984

[51] Int. Cl.[4] .................. H01M 2/00; H01M 16/50
[52] U.S. Cl. ................................ 429/62; 429/122; 320/35
[58] Field of Search ............... 429/61, 62, 1, 8, 9, 429/100, 178, 179, 120, 121, 122; 320/35, 36

[56] References Cited

U.S. PATENT DOCUMENTS

| | | | |
|---|---|---|---|
| 2,421,523 | 6/1947 | Rady | 320/35 |
| 2,422,925 | 6/1947 | Rady et al. | 136/181 |
| 2,498,814 | 2/1950 | Little et al. | 320/23 |
| 3,274,477 | 9/1966 | Boyes | 320/35 |
| 3,763,416 | 10/1973 | Jache | 429/61 X |
| 3,928,079 | 12/1975 | Jennings et al. | 429/179 |
| 4,100,475 | 7/1978 | Gansert et al. | 320/35 |

Primary Examiner—Anthony Skapars
Attorney, Agent, or Firm—Lawrence B. Plant

[57] ABSTRACT

Battery temperature sensing device including a sensor embedded in a housing and together secured to the underside of a battery cable terminal for pressing against the side wall of the battery beneath the electrolyte level therein when the terminal is coupled to the battery. The housing conforms to the underside of the terminal and is detachably secured to the terminal by means of a cap which conforms to the topside of the terminal and is adjoined to the housing via snap-in fasteners.

7 Claims, 4 Drawing Figures

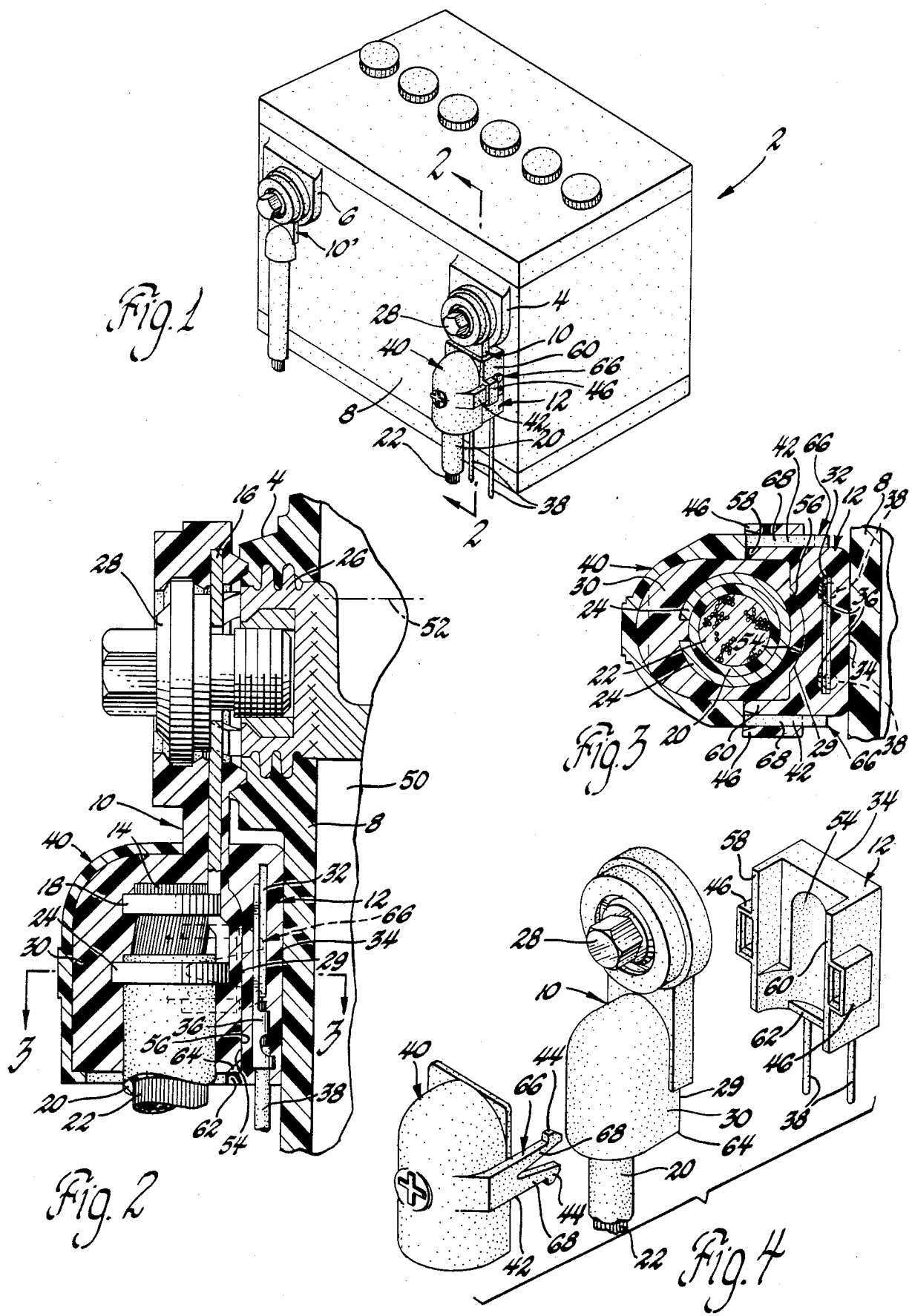

BATTERY TEMPERATURE SENSOR AND HOUSING THEREFOR

This invention relates to devices for sensing the temperature of an automobile electric storage battery as a means to control the charging rate of the battery as a function of battery temperature.

It is a well known that the charge acceptance of a battery varies with temperature and that the charging rate should be varied in accordance with battery temperature to obtain optimum charging. Accordingly, voltage regulators for automobile SLI (i.e., starting, lighting and ignition) batteries have long been provided with temperature compensating devices for varying the generator voltage, and hence the charging rate, as a function of temperature. In this regard, when the temperature of the battery increases, the temperature compensating device causes the voltage regulator to reduce the generator voltage, and vice-versa, whereby the battery will be properly charged in either hot or cold weather.

Temperature compensated voltage regulators are only as effective as the ability of the temperature sensors used therewith to reliably sense battery temperature. Some automobile manufacturers include a temperature sensor (e.g., thermister) in the same package as the other voltage regulator components and then locate the voltage regulator in the vehicle's generator/alternator which is remote from the battery. Sensors so located sense the ambient temperature in the engine compartment as an indication of the temperature of a battery also located in the engine compartment. Sensors so located are not effective indicators of actual battery temperature under many circumstances. For example, sensors so located are particularly poor means for indicating the temperature of batteries located elsewhere in a vehicle (e.g., trunk or passenger compartment) or of batteries which have been affected by heat other than the ambient (e.g., in-service resistive heating).

It has been generally recognized: that the temperature sensor would best be located proximate the battery for the most accurate sensing of its temperature; and that the temperature of the battery electrolyte is a good indication of the overall temperature of the battery. Accordingly, proposals have been made to locate the voltage regulator, or temperature sensitive portions thereof, adjacent, or even as part of, the battery itself. In some cases, temperature sensing probes have been immersed directly into the electrolyte (e.g., through filler openings and vent plugs). For the most part, such proposals have required some structural modification of the battery itself which unduly complicates its manufacture and cost.

It is an object of the present invention to provide a simple, discrete device for sensing battery temperature, which device is secured (preferably detachably) to the underside of the terminal of a battery cable and thereby pressed against the outside wall of the battery container so as to sense the temperature of the electrolyte through the wall. This and other objects and advantages of the present invention will become more readily apparent from the detailed description thereof which follows and which is given hereafter in conjunction with the several Figures in which:

FIG. 1 is an isometric view of a battery including a temperature sensor and housing in accordance with the present invention;

FIG. 2 is a partially sectioned side elevational view in the direction 2—2 of FIG. 1;

FIG. 3 is a sectioned plan view in the direction 3—3 of FIG. 2; and

FIG. 4 is an exploded view of the battery cable terminal and temperature sensor housing of FIG. 1.

BRIEF DESCRIPTION OF THE INVENTION

The present invention comprehends: a temperature sensor (e.g., a thermister or other temperature responsive device) for controlling the charging voltage supplied to a battery as a function of battery temperature; and a housing embedding the sensor and secured to the underside of a battery cable terminal such that when the terminal is coupled to the battery the housing is pressed firmly against the battery container wall below the electrolyte level in the battery for substantially directly (i.e., separated only by the wall and sensor housing materials) sensing the temperature of the battery electrolyte on the other side of the wall. The term "underside", as used herein, means that face of the cable terminal which confronts the battery container when the terminal is coupled to the battery. Similarly the term "topside" of the terminal, as used herein, means that face of the cable terminal which is opposite to the underside and faces outwardly from the battery when the terminal is coupled to the battery. Preferably, the housing substantially conforms to the shape of the underside of the cable terminal and is secured to the terminal by a cap which fits over, and conforms substantially to, the shape of the topside of the terminal for restricting relative movement between the housing and the terminal and contributing to the aesthetics of the design. The housing and cap are preferably detachably secured to the terminal to permit replacement of either the sensor or the battery cable without the need to replace the other. To this end, either the housing or the cap is provided with at least one snap-in/snap-out fastener which comprises a bifurcated, tongue-like male projection which interlocks with a mating female receptacle on the opposite member. Preferably two such fasteners are used (i.e., one on each side of the terminal) for complete separation of the cap and housing one from the other. Alternatively, a single such fastener may be used on one side of the terminal and a thin section plastic hinge or the like on the other side of the terminal.

DETAILED DESCRIPTION OF A PREFERRED EMBODIMENT OF THE INVENTION

FIG. 1 depicts a typical, 12-volt SLI automotive battery 2 including positive and negative terminals 4 and 6, respectively, extending through the sidewall 8 of the battery container. The battery terminals 4 and 6 each have battery cable terminals 10 and 10', respectively, coupled thereto as they would typically be attached in service. Cable terminal 10 attached to the positve battery terminal 4 has the temperature sensor housing 12, of the present invention, secured to the underside thereof as will be described in more detail hereafter.

Referring to FIGS. 2-4, the battery cable terminal 10 comprises an electrically conductive eyelet 16 crimped (i.e., by tongs 18) about the bare end 14 of a conductive wire 22 and potted in an elastomeric (i.e., PVC) covering 30. An insulating sheath 20 covers the conductive wire 22 and is tightly engaged by tongs 24 of the eyelet 16. Flanged bolt 28 coupled the eyelet 16 to the conductive insert 26 of the battery terminal 4 in known fashion.

The particular cable terminal illustrated is described in more detail in U.S. Pat. No. 3,775,730, Rowles et al, assigned to the assignee of the present invention and does not per se constitute a part of the present invention.

The temperature sensor housing 12 is secured to the underside 29 of the terminal 10 at about the junction between the eyelet 16 and the wire end 14. A sensor 32 comprises a printed-circuit type thermister and is embedded (e.g., insert molded) in the housing 12 as close to the external surface 34 thereof as is possible in order to obtain as short a thermal conduction path as possible between the sensor 32 and the electrolyte 50 in the battery 2. Blade-type electrical contacts 36 soldered to the sensor 32 are coupled to lead wires 38 for connecting the sensor 32 to the voltage regulator.

The cable side of the housing 12 substantially conforms to the shape of the cover 30 on the underside 29 of the terminal 10 so as to mate therewith in a manner which subtantially prevents any relative movement between the housing 12 and the terminal 10. More specifically, the housing 12 includes: a concave recess 54 for receiving the convex surface 56 on the underside 29 of the terminal 10—where the covering 30 is formed about the sheath 20; upstanding lateral flanges 58 and 60 for engaging the cover 30 on either side thereof (see FIG. 3); and upstanding rearward flange 62 for engaging the shoulder 64 on the cover 30.

The housing 12 is secured to the terminal 10 by means of a cap 40 which conforms to the shape of the topside of the cover 30. Snap-in type fasteners 66 on either side of the terminal 10 permit ready attachment and/or detachment of the cap 40 from the housing 12 and the battery cable terminal 10 as may be needed to replace the sensor and/or battery cable. In this regard and as best shown in FIG. 4, the snap-in type fasteners 66 comprise bifurcated, tongue-like male members 42 having locking lugs 44 on the ends of the prongs 68 thereof and female receptacles 46 for receiving the members 42. As shown, the cap 40 carries the male members 42 and the housing 12 carries the female receptacles 46, but reversal of this relationship is also possible. The depth of the receptacles 46 is less than the length of the prongs 68 such that the prongs 68 pass through the receptacles 46 so that the lugs 44 will lockingly engage the backside thereof. Squeezing of the lugs 44 together permits the members 42 to be removed from the receptacles and the cap 40 separated from the housing 12.

When the battery cable terminal 10 is secured to the battery terminal 4, the housing 12 is pressed firmly against the sidewall 8 of the battery container such that the thermister 32 is in close thermal proximity to the electrolyte 50 below the level 52 thereof for substantially direct sensing of the electrolyte's temperature through the wall 8.

While the invention has been described solely in terms of a specific embodiment thereof it is not intended to be limited thereto but rather only to the extent set forth in the claims which follow.

The embodiments of the invention in which an exclusive property or privilege is claimed are defined as follows:

1. Device for externally sensing the approximate temperature of the electrolyte of an electrical storage battery through a wall of the battery's container for controlling the recharge of the battery at various temperatures comprising:

a temperature sensor;

a discrete housing embedding said sensor, said housing being adapted for mounting to the underside of a battery cable terminal and for pressing against said wall, and means astride said terminal for securing said housing to said terminal such as to position said sensor in heat conductive relation to said wall beneath the electrolyte level in said container when said cable is coupled to said battery.

2. Device for externally sensing the approximate temperature of the electrolyte of an electrical storage battery through a wall of the battery's container for controlling the recharge of the battery at various temperatures comprising:

a temperature sensor;

a housing embedding said sensor, said housing being adapted for mounting to the underside of a battery cable terminal which presses said housing against said wall such as to position said sensor in heat conductive relation to said wall beneath the electrolyte level in said container when said cable is coupled to said battery, the shape of said housing conforming substantially to the shape of the underside of said terminal confronting said battery;

a cap conforming substantially to the shape of the topside of said terminal facing outwardly of said battery; and fastener means on said housing and said cap for securing each to the other snugly about said terminal.

3. Device for externally sensing the approximate temperature of the electrolyte of an electrical storage battery through a wall of the battery's container for controlling the recharge of the battery at various temperatures comprising:

a temperature sensor;

a housing embedding said sensor and positioning said sensor in heat conductive relation to said wall, said housing being adapted to engage the underside of a battery cable terminal which presses said housing against said wall below the electrolyte level in said container when said cable is coupled to said battery, the shape of said housing conforming substantially to the shape of the underside of said terminal confronting said battery;

a cap conforming substantially to the shape of the topside of said terminal facing outwardly of said battery; and fastener means on said housing and said cap for securing each to the other detachably from said terminal.

4. Device for externally sensing the approximate temperature of the electrolyte of an electrical storage battery through a wall of the battery's container for controlling the recharge of the battery at various temperatures comprising:

a temperature sensor;

a housing embedding said sensor and positioning said sensor in heat conductive relation to said wall, said housing being adapted to engage the underside of a battery cable terminal which presses said housing against said wall below the electrolyte level in said container when said cable is coupled to said battery, the shape of said housing conforming substantially to the shape of the underside of said terminal confronting said battery;

a cap conforming substantially to the shape of the topside of said terminal facing outwardly of said battery; and fastener means on said housing and said cap for separably securing each to the other and detachably from said terminal.

5. An SLI battery and cable assembly including an electric storage battery having a terminal on a side wall thereof, a cable having a connecting terminal thereon secured to said battery terminal, and discrete means engaging said side wall for sensing the temperature of the battery for controlling the recharge of the battery at various temperatures, said means comprising a temperature sensor, a housing embedding said sensor, and means for securing said housing to the underside of said connecting terminal confronting said side wall, said housing being snugly held in position by said connecting terminal between said connecting terminal and said wall such that said sensor is in heat conductive relation to said wall beneath the electrolyte level in said container for substantially directly sensing the temperature of said electrolyte.

6. An SLI battery and cable assembly including an electric storage battery having a terminal on a side wall thereof, a cable having a connecting terminal thereon secured to said battery terminal, and means for sensing the temperature of the battery for controlling the recharge of the battery at various temperatures, said means comprising a temperature sensor embedded in a housing which conforms substantially to the underside of said terminal and is snugly positioned between said connecting terminal and said wall such that said sensor is in heat conductive relation to said wall beneath the electrolyte level in said container, a cap which conforms substantially to the topside of said terminal and engages said housing to secure said housing to said terminal, and a snap-in fastener coupling said cap and housing one to the other onto said terminal.

7. An SLI battery and cable assembly including an electric storage battery having a terminal on a side wall thereof, a cable having a connecting terminal thereon secured to said battery terminal, and means for sensing the temperature of the battery for controlling the recharge of the battery at various temperatures, said means comprising a temperature sensor embedded in a housing which conforms substantially to the underside of said terminal and is snugly positioned between said connecting terminal and said wall such that said sensor is in heat conductive relation to said wall beneath the electrolyte level in said container, a cap conforming substantially to the topside of said terminal and engaging said housing to secure said housing to said terminal, first and second bifurcated, tongue-like snap-in male members projecting from said cap along opposite sides of said terminal and female receptacle members on opposite sides of said housing interlockingly receiving said male members for coupling said housing to said cap and terminal.

* * * * *